(12) United States Patent
Hammerbeck

(10) Patent No.: US 8,874,418 B2
(45) Date of Patent: Oct. 28, 2014

(54) SYSTEMS AND METHODS FOR AUTOMATED SIMULATION OF A PROPULSION SYSTEM AND TESTING OF PROPULSION CONTROL SYSTEMS

(75) Inventor: Warren John Hammerbeck, Virginia Beach, VA (US)

(73) Assignee: Engineering Services Networks, Inc., Arlington, VA (US)

( * ) Notice: Subject to any disclaimer, the term of this patent is extended or adjusted under 35 U.S.C. 154(b) by 890 days.

(21) Appl. No.: 12/485,361

(22) Filed: Jun. 16, 2009

(65) Prior Publication Data

US 2009/0312882 A1 Dec. 17, 2009

Related U.S. Application Data

(60) Provisional application No. 61/061,988, filed on Jun. 16, 2008.

(51) Int. Cl.
*G06G 7/66* (2006.01)
*G06G 7/64* (2006.01)
*G05B 17/02* (2006.01)

(52) U.S. Cl.
CPC ....................................... *G05B 17/02* (2013.01)
USPC ........................................................... 703/7

(58) Field of Classification Search
CPC ................. G05B 19/0426; G05B 2219/23272; G05B 2219/23446; G05B 2219/37453
See application file for complete search history.

(56) References Cited

U.S. PATENT DOCUMENTS

| | | | |
|---|---|---|---|
| 2005/0055666 A1* | 3/2005 | Kornerup et al. | 717/105 |
| 2007/0038321 A1 | 2/2007 | McDonald | |
| 2007/0143090 A1* | 6/2007 | Skjetne et al. | 703/18 |

FOREIGN PATENT DOCUMENTS

| | | |
|---|---|---|
| JP | 2008033608 A | 2/2008 |
| KR | 20080028605 A | 4/2008 |

OTHER PUBLICATIONS

Duvall et al. "A Real-Time Hardware-in-the-Loop Simulation Environment for a Ship Propulsion System", 2007, 11 pages.*
Song et al. "Diesel Engine Speed Regulation Using Linear Parameter Varying Control", 2003, IEEE, Proceedings of the Americal Control Conference, pp. 779-784.*
PCT/US2009/047516 International Search Report.

* cited by examiner

*Primary Examiner* — Suzanne Lo
(74) *Attorney, Agent, or Firm* — MH2 Technology Law Group, LLP

(57) ABSTRACT

A multiple application automated test set (MAATS) system can simulate the operation of a power plant. To simulate the operation of the power plant, the MAATS system can be configured to "stand in" for the power plant by receiving the control signals from a controller and by generating electrical signals, readable by the controller, that represent the operating parameters and conditions of the power plant.

18 Claims, 3 Drawing Sheets

SYSTEMS AND METHODS FOR AUTOMATED SIMULATION OF A PROPULSION SYSTEM AND TESTING OF PROPULSION CONTROL SYSTEMS

CROSS-REFERENCE TO RELATED APPLICATIONS

This application claims priority to U.S. Provisional Patent Application Ser. No. 61/061,988 filed on Jun. 16, 2008, the disclosure of which is incorporated in its entirety by reference herein.

FIELD

This invention relates generally to systems and methods for simulation and testing of power plants and power plant control systems.

BACKGROUND

Most crafts today, such as ships, cars, trains, etc., contain some type of power plant to provide power to the craft and to provide propulsion for the craft. The power plant typically is some form of internal combustion or turbine engine. Typically, these power plants are controlled by an electronic controller. The controller is responsible for controlling the power plant and monitoring the operating conditions of the power plant. The controller is responsible for starting the power plant, regulating fuel supply to the power plant, monitoring operating conditions of the power plant (fuel level, temperature, oil supply and pressure, engine speed), stopping the power plant (normally and in the event of a problem in the plant). The controller typically communicates with the power plant via electrical signals.

Because the controller is responsible for the operation of the power plant, it is crucial that the controller is configured properly and operates properly. If the controller is defective or improperly configured, the power plant or the craft can be damaged. For example, the controller can be set to stop the power plant in the event an operating parameter, such as oil pressure, reaches a certain level. If the controller is set to an incorrect oil pressure level or the controller is improperly monitoring the oil pressure, the power plant may be damaged if oil pressure drops too low.

Conventionally, to prevent power plant malfunction, the controllers were regularly configured and tested to ensure proper operation. Conventional methods, however, are cumbersome and inefficient. To prevent damage during configuration and testing, the controller may be removed from the power plant and configured on a test power plant.

Likewise, the controller may be configured utilizing simulators. These simulators "mimic" the various parameters of a power plant. That is, the simulators receive the electrical signals from the controller and provide electrical signals to the controller as would an operating power plant. Traditionally, these simulators consist of a series of electrical circuits, such as transistors, oscillators, etc. that generate and receive the electrical signals.

In these simulators, a human operator must individually initiate and tune each electrical signal representing an operating parameter of the power plant As such, only a single parameter, such as an oil pressure set point, can be configured and tested at a time, which is time consuming. Additionally, because the conventional simulator is tuned by a human operator, the method can be inaccurate. Also, the simulator can not mimic the true operation of the power plant because the human operator cannot simultaneously vary all operating parameters to accurately mimic a power plant. Accordingly, methods and systems are needed that accurately and efficiently simulate a power plant for configuration and testing of controllers.

BRIEF DESCRIPTION OF THE DRAWINGS

The accompanying drawings, which are incorporated in and constitute a part of this specification, illustrate embodiments of the present disclosure and together with the description, serve to explain the embodiments.

DETAILED DESCRIPTION

Reference will now be made in detail to the exemplary embodiments of the disclosure, an example of which is illustrated in the accompanying drawings. Wherever possible, the same reference names and numbers will be used throughout the drawings to refer to the same or like parts.

In the following description, reference is made to the accompanying drawings that form a part thereof, and in which is shown by way of illustration specific exemplary embodiments. These embodiments are described in sufficient detail to enable those skilled in the art to practice the embodiments and it is to be understood that other embodiments can be used and that changes can be made without departing from the scope of this disclosure. The following description is, therefore, merely exemplary.

Figure 1:
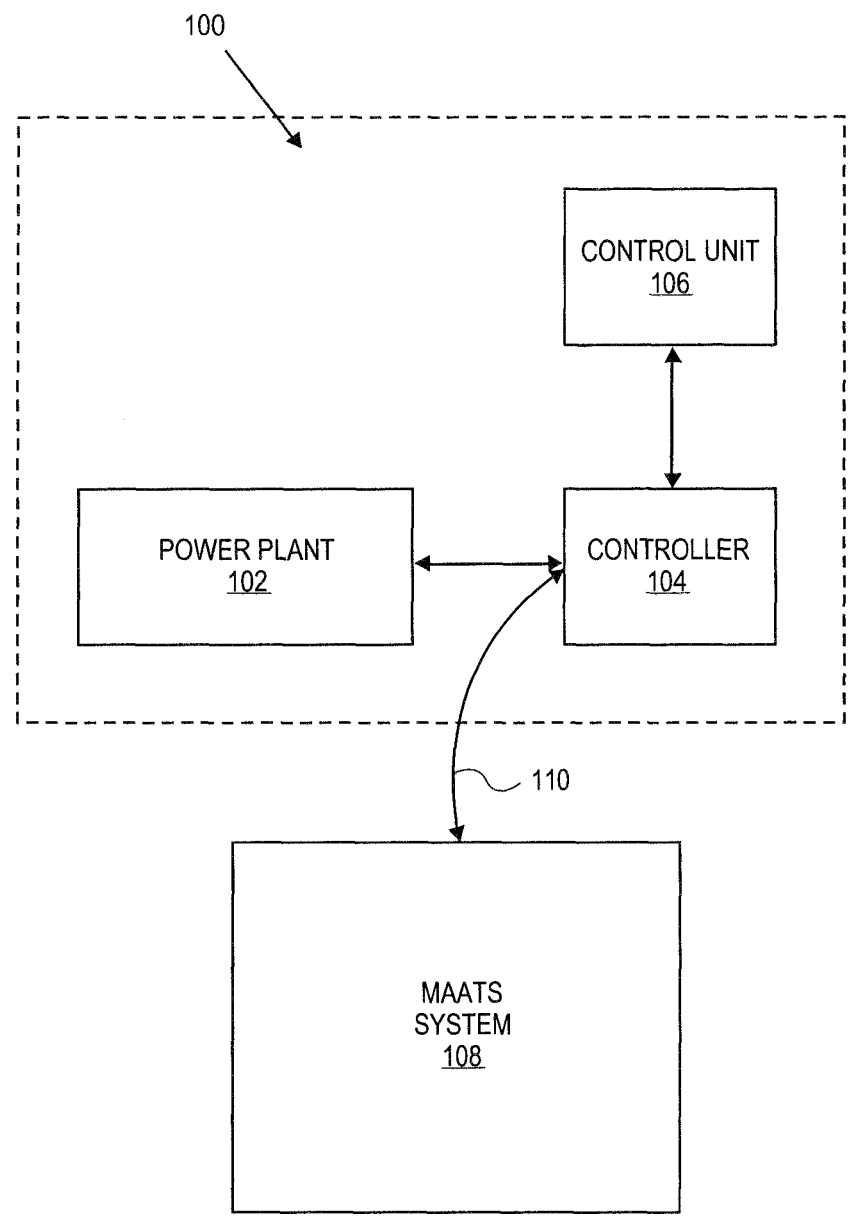
FIG. 1 is a diagram illustrating a propulsion system according to various embodiments.

FIG. 1 illustrates an exemplary propulsion system 100 according to various embodiments. Propulsion system 100 can be any type of system utilized to drive and power a craft, such a ship, vehicle, airplane, train and the like. Propulsion system 100 includes a power plant 102, a controller 104, and a control unit 106.

Power plant 102 provides the propulsion and power for propulsion system 100. Power plant 102 can be any type of engine capable of generating power and driving a propulsion device. Power plant 102 can be, for example, a gas turbine engine, diesel turbine engine, gas internal combustion engine, diesel internal combustion engine, nuclear reactor, coal fire engine, and the like.

Controller 104 provides control signals to power plant 102 and monitors the operating parameters and conditions of power plant 102. Controller 104 can include a combination of electronics, firmware, and software to communicate with, monitor, and control power plant 102. Controller 104 can be configured to monitor and control the operating parameters and conditions of power plant 102 by transmitting electrical signals to and receiving electrical signals from power plant 102. Controller 104 can be configured to initiate and/or power down power plant 102 during normal operation and in the event of problem conditions. One skilled in the art will realize that controller 104 can include any number of systems and devices to provide control of power plant 102.

Control unit 106 provides an operator of the propulsion system 100 with an interface to control power plant 102. Control unit 106 receives signals from controller 104 and transmits signals for control actions to controller 106. For example, if the craft is a ship, control unit 106 can include all control systems in the control room. One skilled in the art will realize that control unit 106 can include any number of systems and devices that provide interfaces to control power plant 102.

In order to ensure proper operation of propulsion system 100, controller 104 can be configured and tested to guarantee controller 104 functions properly. According to various embodiments, a multiple application automated test set (MAATS) system 108 can be provided in order to configure and test controller 104. MAATS system 108 can be coupled to controller 104. MAATS system 108 can be coupled to controller 104 to replace one or more connections between power plant 102 and controller 104 without removing the controller 104 from the propulsion system 100. In particular, MAATS system 108 can be coupled to controller 104 via a link 110. Link 110 can be configured to interface with a specific controller 104 and different links can be utilized to couple MAATS system 108 to different types of controllers.

In embodiments, MAATS system 108 can be configured to simulate the operation of power plant 102. To simulate the operation of power plant 102, the MAATS system 108 can be configured to "stand in" for power plant 102 by receiving the control signals from the controller 104 and by generating electrical signals, readable by controller 104, that represent the operating parameters and conditions of power plant 102. To achieve this, MAATS system 108 can be a portable computer system including a combination of hardware, firmware, and software to receive the control signals from the controller 104 and to generate electrical signals that represent operating parameters and conditions of the power plant 102. The operating parameters and conditions can include, for example, power plant state (on or off), power plant generator and/or turbine speed (revolution per minute), power plant oil level and/or pressure, fuel level and/or pressure, power plant temperature, and the like.

According to embodiments, in order to simulate the operation of power plant 102, MAATS system 108 can include information that describes the interaction of power plant 102 and controller 104. This information can include the type of control signals communicated between controller 104 and power plant 102 and the type of operating conditions and parameters monitored by controller 104. This information can include the specific format (analog/digital, voltage range, waveform type, etc.) of the control signals provided by controller 104 and the specific format (analog/digital, voltage range, waveform type, etc.) of electrical signals generated by power plant 102 that represent the operating parameters and conditions of power plant. MAATS system 108 can include information that describes multiple types of power plants and controllers. As such, MAATS system 108 can be utilized to test and configure multiple types of controllers and simulate multiple types of power plants.

According to embodiments, in order to simulate the operation of power plant 102, MAATS system 108 can be configured to generate and to vary the electrical signals representing the operating parameters and conditions as a group in order to accurately simulate the power plant operation. That is, MAATS system 108 can be configured to generate and vary multiple electrical signals simultaneously in order to simulate the power plant operation. For example, MAATS system 108 can generate a signal that represents a specific turbine speed and at the same time generate a signal that represents an oil pressure and temperature corresponding to the turbine speed.

According to embodiments, to accurately simulate the operation of power plant 102, MAATS system 108 can include information that describes the interaction of the different operating parameters and conditions of power plant 102. This information can describe how the various operating parameters and conditions change relative to each other. For example, in a turbine engine, MAATS system 108 can include information that defines how oil pressure and temperature change over time or in response to a specific change in turbine speed. Additionally, this information can include various simulated scenarios of power plant 102. For example, MAATS system 108 can include simulated scenarios that describe the operating parameters and conditions during power-up and power-down of power plant 102. As such, MAATS system 108 can accurately simulate the operation of power plant 104 without requiring an operator to physically tune a simulator to reach a specific operating parameters or conditions in order to simulate the operation of power plant 104.

According to embodiments, as MAATS system 108 simulates the operation of power plant 102, MAATS system 108 and controller 104 can exchange the control signals and the electrical signals representing the operating parameters and conditions via link 110. MAATS systems 108 can provide the generated electrical signals representing the operating parameters and conditions to controller 104 via link 110. Likewise, controller 104 can provide control signals to MAATS system 108 via link 110 and, in response to the control signals, MAATS system 108 can simulate the operation of power plant 102 and generate electrical signals that represent the operation of power plant 102. As such, controller 104 can receive and process the generated electrical signals, as if controller 104 was communicating and controlling power plant 102.

According to embodiments, MAATS system 102 can be utilized to test and configure controller 104. MAATS system 108 can be configured generate electrical signals that represent specific operating parameters or conditions and test controller 104 to determine if controller 104 is properly monitoring the operating parameters and conditions. For example, in a turbine engine, controller 104 can be set to monitor for a specific temperature and/or oil pressure at which problems with power plant 102 can occur (e.g. possible damage to power plant 102) and can shut-down power plant 102 if the specific temperature and/or oil pressure is reached. In this example, to test controller 104, MAATS system 108 can generate electrical signals that represent an operating temperature and/or oil pressure that exceeds the specific temperature and/or oil pressure and can monitor controller 104 to determine if controller 104 detects the change in temperature and/or oil pressure and to determine if controller 104 takes appropriate action (e.g. shut down of power plant 102). MAATS system 108 can be configured to output the results of the monitoring to allow an operator to view the results of the test and can be configured to allow the operator to modify the operation of the controller.

According to embodiments, MAATS system 108 can be utilized to simulate normal operation of power plant 102. MAATS system 108 can be configured to generate electrical signals that represent operating parameters in response to control signals output from controller 104. As such, MAATS system 108 can appear as a virtual power plant to controller 104. MAATS system 108 can be configured to receive the control signals from controller 104 and generate the appropriate electrical signals representing operation of a power plant in response to the control signals. By acting as a virtual power plant, MAATS system 108 can test controller 104 under simulated operating conditions. Additionally, by acting as a virtual power plant, an operator can utilize control unit 106 as if power plant 102 was in operation without requiring the physical operation of power plant 102.

Figure 2:
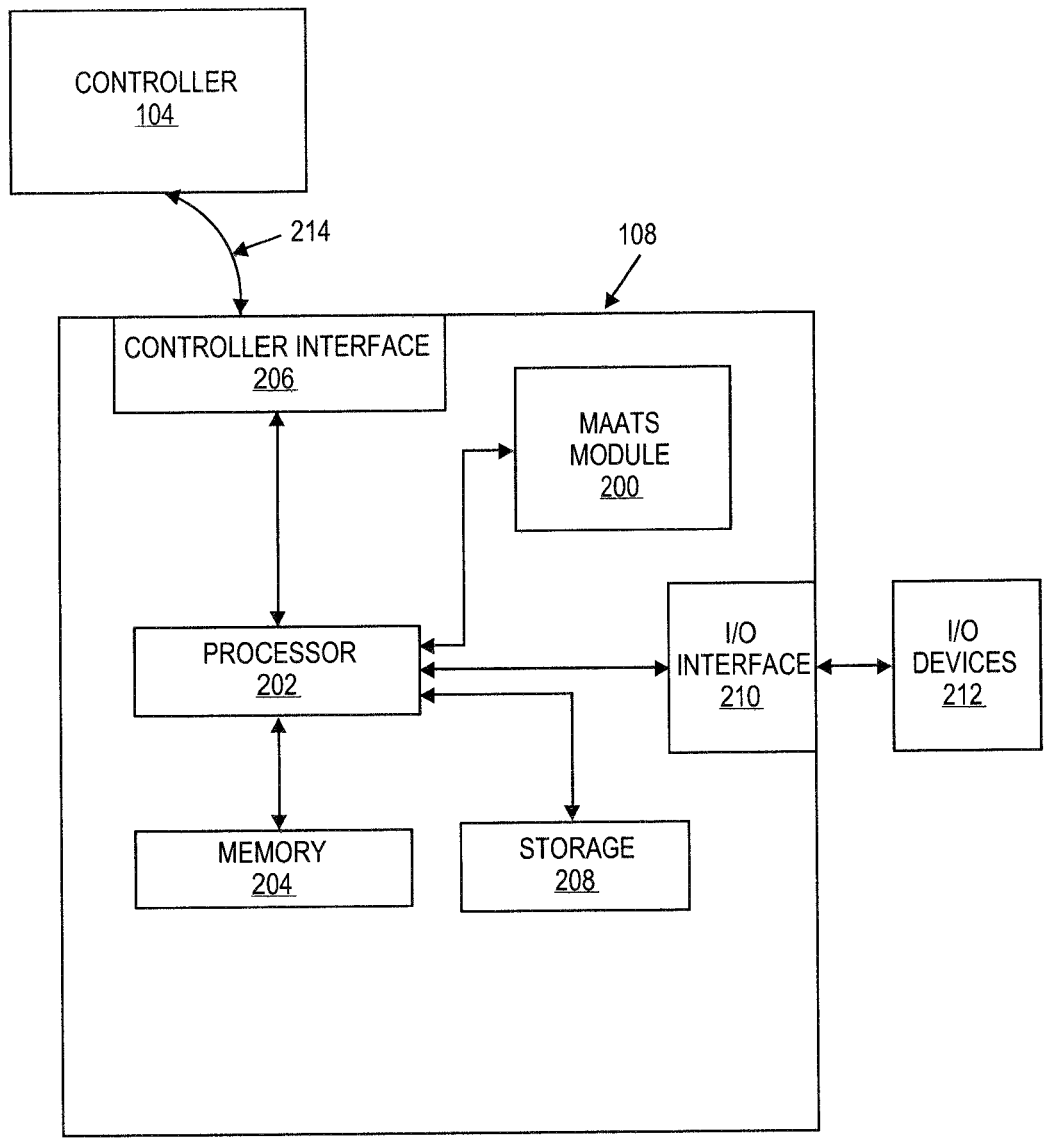
FIG. 2 is a block diagram illustrating a Multiple Application Automated Test Set (MAATS) system according to various embodiments.

FIG. 2 illustrates an exemplary diagram of hardware and other resources that can be incorporated in MAATS system 108 including a MAATS module 200, according to embodiments. While FIG. 2 illustrates exemplary hardware and other resources that can be incorporated in MAATS system 108, other configurations of MAATS system 108 and other hardware and software resources are possible.

In embodiments as shown, MAATS system 108 can comprise a processor 202 communicating with memory 204, such as electronic random access memory, operating under control of or in conjunction with an operating system (not shown). Processor 202 can be, for example, a central processing unit (CPU), a micro-controller unit (MCU), digital signal processor (DSP), or the like. The operating system can be, for example, a distribution of the WINDOWS operating system, a distribution of the LINUX operating system, the UNIX operating system, or other open-source or proprietary operating system or platform. Processor 202 also communicates with one or more computer readable storage media or devices 208, such as hard disk drives or optical drives. Processor 202 further communicates with controller interface 206.

Processor 202 also communicates with MAATS module 200, to execute control logic and control the operation of simulation and testing described above and below. For example, MAATS module 200 can be configured with various power plant simulations. The simulations represent the operations of different types of power plants including the control signals received by the power plant and the operating conditions and parameters generated by the power plant. MAATS module 200 can be configured to receive control signals from controller 104 and to generate electrical signals that represent the operating parameters and conditions according to the information contained in the simulations. As such, MAATS module 200 can enable MAATS system 108 to operate as a stand-in for power plant 102 for testing, configuration, and simulation.

According to embodiments, for the particular simulation associated with controller 104 and power plant 102, the MAATS module 200 can include logic, commands, and instructions that describe the interaction of power plant 102 and controller 104. The logic, commands, and instructions can include the type of control signals communicated between controller 104 and power plant 102 and the type of operating conditions and parameters monitored by controller 104. The logic, commands, and instructions can include the specific format (analog/digital, voltage range, waveform type, etc.) of the control signals provided by controller 104 and the specific format (analog/digital, voltage range, waveform type, etc.) of electrical signals generated by power plant 102 that represent the operating parameters and conditions of power plant 102. As such, processor 202 executing MAATS module 200 can receive and process the control signals from controller 104 via controller interface 206 Likewise, processor 202 executing MAATS module 200 can generate and provide electrical signals to controller 104 via controller interface 206 that simulate the operation of power plant 102.

According to embodiments, for the particular simulation associated with controller 104 and power plant 102, MAATS module 200 can include logic, commands, and instructions that describe the interaction of the different operating parameters and conditions of power plant 102. The logic, commands, and instructions can describe how the various operating parameters and conditions change relative to each other. For example, if power plant 102 was a turbine engine, MAATS module 200 can include information that defines how oil pressure and temperature change over time or in response to a specific change in turbine speed. Additionally, the logic, commands, and instructions can include various simulated scenarios of power plant 102. For example, MAATS module 200 can include simulated scenarios that describe the operating parameters and conditions during power-up and power-down of power plant 102. As such, processor 202 executing MAATS module 200 can generate electrical signals that accurately represent the operating parameters and conditions of power plant 102.

According to embodiments, MAATS module 200 can be written in program code and executed by processor 202 in conjunction with memory 204 and storage 208. MAATS module 200 can be implemented in computer languages such as LAB VIEW, PASCAL, C, C++, VISUAL BASIC JAVA, HTML, XML and the like. One skilled in the art will realize that the components, functions, and methods described above and below can be implemented in any computer language and any application. MAATS module 200 can be embodied in storage 208 and/or memory 204 as instructions for causing MAATS system 108 to perform the functions and processes described above and below.

Processor 202 further communicates with controller interface 206. Controller interface 206 can be any type of interface to convert the communications from MAATS module 200 and processor 202 into electrical signals readable by controller 104. MAATS system 108 can be coupled to controller 104 via link 214. Link 214 can be any type or wired or wireless interface in order to couple controller 104 to MAATS system 108. Link 214 can be changed to allow MAATS system 108 to couple to different types of controllers 104. For example, the controller interface 206 can be configured as a universal interface that can be coupled to different types of links 214 in order to interface with different types of controllers 104. In this example, the different types of links 214 can include a universal connector configured to interface with controller interface 206 and different connectors configured to interface with the different types of controllers 104. Likewise, the different types of links 214 can include different types of wireless formats and protocols.

Input/output interface 210 provides an interface for coupling I/O devices 212 which a user can utilize to control MAATS system 108. For example, I/O devices 212 can include a keyboard, a mouse, a display, a network interface, sound device and the like. MAATS module 200 can be configured to generate and to provide an interface via input/output interface 210 to allow an operator to interact with the MAATS system 108 to control to operation of MAATS system 108 and test and configure controller 104. MAATS module 200 can be configured to generate the interface to allow the operator to select various scenarios to initiate on MAATS system 108 and to specify operating parameters and conditions to vary on the MAATS system 108. Likewise, MAATS module 200 can be configured to generate the interface to include a display of the operation of controller 104 (control signal received, response to changes in operating parameters and conditions, etc.). MAATS module 200 can be configured to generate the interface to allow the operator to alter the configuration of controller 104. To achieve this, MAATS module 200 can contain the necessary logic to generate graphical user interfaces (GUIs) or contain the necessary logic to utilize other programs or applications to receive input from an operator and to display information received from controller 104.

Figure 3:
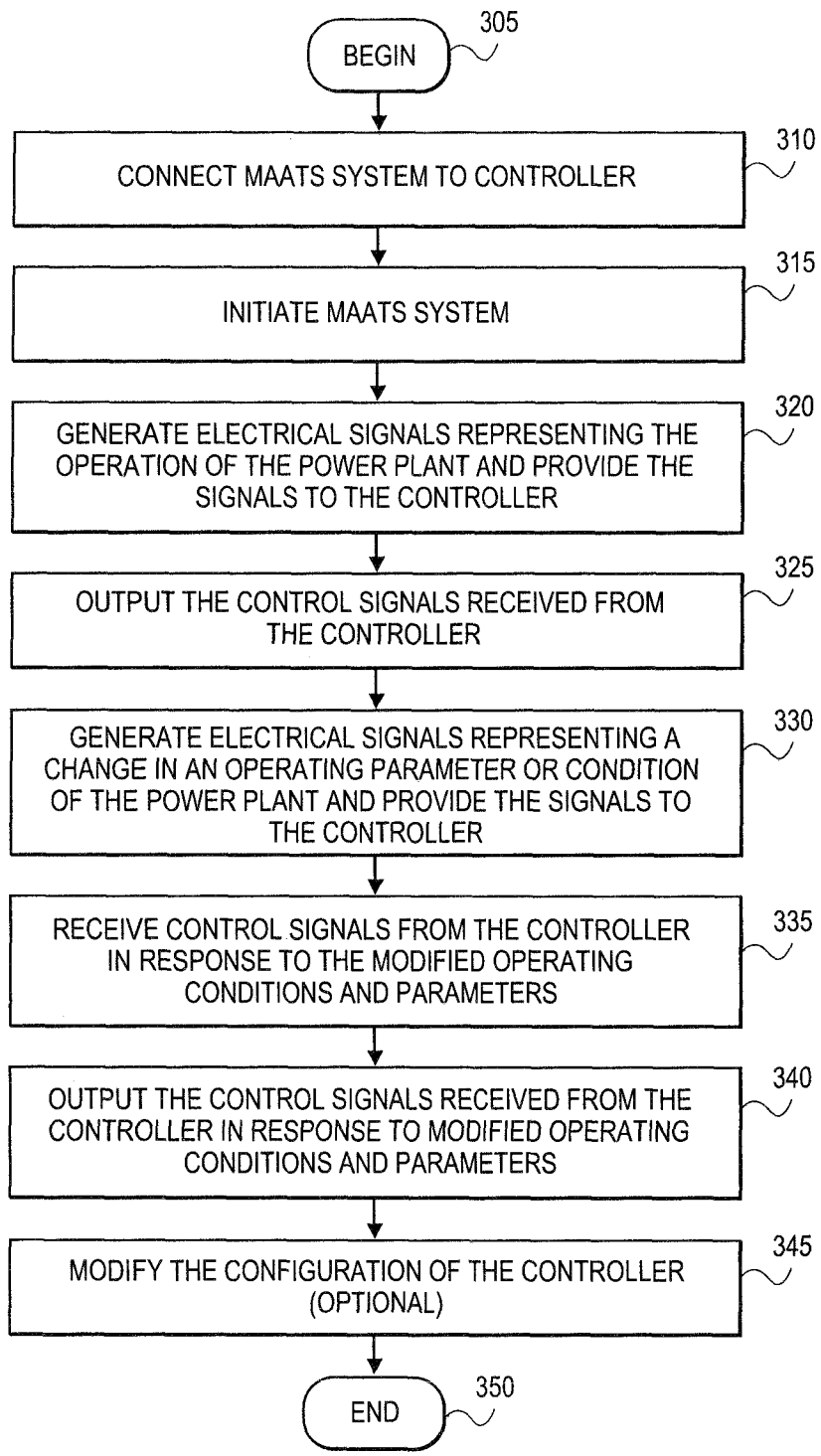
FIG. 3 is a flow chart illustrating exemplary process performed by the MAATS system according to various embodiments.

As mentioned above, MAATS system 108 can be coupled to a propulsion system for stimulation, configuration, and testing. FIG. 3 illustrates an exemplary process for simulating the operation of power plant 102 and testing and configuration of controller 104 utilizing MAATS system 108. In 305, the process can begin.

In 310, MAATS system 108 can be connected to controller 104. For example, an operator can physically connect link 214 to both controller interface 206 and controller 104. Once connected, MAATS system 108 can serve as a "stand-in" for power plant 102 and simulate the operation of power plant 102.

In 315, MAATS system 108 can be initiated. For example, the operator of MAATS system 108 can power up MAATS system 108 and select the type of controller 104 connected to MAATS system 108 and the type of power plant 102 to simulate. Additionally, MAATS system 108 can automatically detect the type of controller 104 and the type of power plant 102 to simulate. Likewise, the operator of MAATS system 108 can select a particular scenario to initiate, such as power-up. Additionally, MAATS system 108 can automatically begin a predetermined scenario or begin simulating the power plant 102 when control signals (e.g. power-up control signals) are received from controller 104.

In 320, MAATS system 108 can generate electrical signals representing the operation of power plant 102 and provide the signals to controller 104. For example, MAATS module 200 can determine operating conditions and parameters associated with the scenario and/or associated with control signals received from controller 104 and can instruct the controller interface 206 to generate electrical signals representing the operating conditions and parameters.

In 325, MAATS system 108 can output the control signals received from controller 104 and the operating conditions and parameters. For example, MAATS module 200 can generate an interface that displays the signals received from controller 104 and operating conditions and parameters generated by MAATS system 108 and provide the interface via I/O interface 210.

In 330, MAATS system 108 can generate electrical signals representing a change in an operating parameter or condition of power plant 102 and provide the signals to controller 104. For example, MAATS module 200 can determine one or more specific operating conditions or parameters to modify and can instruct the controller interface 206 to generate electrical signals representing the modified operating conditions and parameters. The change in operating conditions or parameters can be initiated by an operator or occur automatically according to a scenario. For instance, an operator can wish to test the set point temperature contained in controller 104 for shut down of power plant 102.

In 335, MAATS system 108 can receive control signals from controller 104 in response to the modified operating conditions and parameters. For example, MAATS system 108 can receive the control signals via controller interface 206 and interpret the control signals. For instance, when the modified operating conditions reach a set point temperature, the MAATS system 108 can receive a control signal representing shut down of power plant 102.

In 340, MAATS system 108 can output the control signals received from controller 104 in response to modified operating conditions and parameters. For example, MAATS module 200 can generate an interface that displays the signals received from controller 104 and the modified operating conditions and parameters generated by MAATS system 108 and provide the interface via I/O interface 210. For instance, MAATS system 108 can output that a shut down signal was received and the temperature at which controller 104 transmitted the shut down signal.

In 345, MAATS system 108 can modify the configuration of controller 104. For example, if the temperature at which controller 104 transmitted the shut down signal is not proper, MAATS module 200 can instruct the controller interface 206 to generate electrical signals to modify the set point temperature of controller 104. This can be performed automatically or under the direction of the operator.

In 350, the process can end, but the process can return to any point and repeat.

As mentioned above, MAATS system 108 can be utilized to test and configure a variety of propulsion system. For instance, in exemplary embodiments, MAATS system 108 can be configured to test and configure a LM2500 gasoline turbine engine and controllers manufactured by GENERAL ELECTRIC. As such, MAATS module 200 can be configured to include various simulations to simulate the operation of the LM2500 gasoline turbine engine. For example, the MAATS module 200 can be configured to include the necessary logic, commands, and routines to communicate with the controllers of the LM2500 gasoline turbine engine and generate electrical signals that represent the operating parameters and conditions of the LM2500 gasoline turbine engine, such as turbine speed (RPM), temperature, oil pressure, and the like. For example, the MAATS module 200 can include an exemplary scenario that represents the power-up cycle of the LM2500 gasoline turbine engine. Table 1 illustrates exemplary operating parameters and conditions that can be generated by the MAATS module 200 during the power-up cycle and Table 2 illustrates exemplary control signals received from the controller.

TABLE 1

| Operating Parameters and Conditions | Electrical Signals | Scenario |
|---|---|---|
| Lubrication Supply Pressure | 0-100 PGIG<br>4-20 milliamps | Rate of Rise = .75 PSI/sec, Final value @ 5K Gas Generator Speed approximately 25 PSI |
| Fuel Manifold Pressure | 0-1500 PSIG<br>4-20 milliamps | Rate of Rise = 15 PSI/sec, Final value @ 5K Gas Generator Speed approximately 360 PSI |
| Power Turbine Inlet Temp | −.68 to 44.91 millivolts<br>0 to 2000 Deg. F. | Rate of Rise - 35 Deg. F./sec, Final value approximately 770 Deg. F. |
| Icing Status | Discrete<br>Icing - Open<br>Non-Icing - 28 Volts DC | |

TABLE 1-continued

| Operating Parameters and Conditions | Electrical Signals | Scenario |
|---|---|---|
| Starter Overspeed | Discrete<br>>4500 RPM - Open<br><4500 RPM - 28 Volts DC | |
| Starter Regulator Valve | Discrete<br>Valve Open - Open<br>Valve Closed - 28 Volts DC | |
| Gas Generator Speed | Square/Sine wave 50% Duty cycle, Amplitude .1 to 10 VRMS, 70 Hz to 10 KHz | 150 RPM/sec, total time from 0 to 5000 RPM = 33.33 sec |
| Compressor Inlet Air Temp | 0-16 PSIA<br>4-20 milliamps | Set at 14.7 PSIA for entire start sequence |
| Power Turbine Inlet Pressure | 0-75 PSIA<br>4-20 milliamps | Time 0, pressure 14.9 PSIA rate of rise = .085 PSIA/sec, Final value at 33.33 sec = 17.5 PSIA |
| Engine Air Total Inlet Air Temp | 88.25-127.38 Ohms<br>10 milliamps - 1 milliamps nominal<br>−40 Deg. F. to 150 Deg. F. | Set at 80 Deg. F. for entire start sequence |
| NPT 1 Power Turbine Speed | Square/Sine wave 50% duty cycle, Amplitude .1 to 5 VRMS, 50 Hz to 7 KHz | Set for 0 for entire start sequence |
| NPT 2 Power Turbine Speed | Square/Sine wave 50% duty cycle, Amplitude .1 to 5 VRMS, 50 Hz to 7 KHz | Set for 0 for entire start sequence |
| TIC Throttle Input Command | .500-9.99 Volts DC | Set at .5 Volts DC for entire Start Sequence |

TABLE 2

| Control Signals | Electrical Signals |
|---|---|
| Ignition On/Off | Discrete<br>Ignition On - 0 Volts DC<br>Ignition Off - 28 Volts DC |
| Fuel Valve #1 | Discrete<br>Fuel Valve Closed - 0 Volts DC<br>Fuel Valve Open - 28 Volts DC |
| Fuel Valve #2 | Discrete<br>Fuel Valve Closed - 0 Volts DC<br>Fuel Valve Open - 28 Volts DC |
| Starter On/Off | Discrete<br>Starter On - 0 Volts DC<br>Starter Off - 28 Volts DC |
| Gas Generator Speed > 4900 RPM Control | Discrete<br>Speed < 4900 RPM - 0 Volts DC<br>Speed > 4900 RPM - 5 Volts DC |
| Lubrication Supply Pressure Control | Discrete<br>Pressure < 15 PSIG - 0 Volts DC<br>Pressure > 15 PSIG - 5 Volts DC |
| Fuel Manifold Pressure Control | Discrete<br>Pressure < 50 PSIG - 0 Volts DC<br>Pressure > 50 PSIG - 5 Volts DC |
| Temperature > 400 Deg. F. Control | Discrete<br>Temp < 400 Deg. F. (Normal) - 0 Volts DC<br>Temp > 400 Deg. F. - 5 Volts DC |
| Auto Start Command | Discrete<br>Auto Start +10 Volts Dc<br>Pulse 1.5 Sec in duration |

One skilled in the art will realize that the power-up cycle is just one exemplary scenario that can be support by MAATS system 200. One skilled in the art will realize that MAATS module 200 can include any number of scenarios that represent the operation of the LM2500 gasoline turbine engine to allow the MAATS system 108 to "stand-in" for the LM2500 gasoline turbine engine. Likewise, MAATS system 108 can be configured to vary specific operating parameters and conditions of the LM2500 gasoline turbine engine and monitor the response by the controllers associated with the LM2500 gasoline turbine engine. Additionally, one skilled in the art will realize that MAATS system 108 can support any type of propulsion system.

Certain embodiments may be performed as a computer application, program, or module. The computer application, program, or module can exist in a variety of forms both active and inactive. For example, the computer application, program, or module can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for simulation of an engine of a propulsion system, comprising:
   generating, by a simulator of the engine of the propulsion system, a plurality of signals, the signals representing operating of the engine of the propulsion system, wherein the signals are selected from the group consisting of: propulsion system operating state, propulsion system generator speed, propulsion system turbine speed, propulsion system oil level, propulsion system oil pressure, propulsion system fuel level, propulsion system fuel pressure, propulsion system temperature, and combinations thereof;
   providing the plurality of signals to a controller of the engine of the propulsion system; and
   modifying the plurality of signals, wherein the plurality of signals are selectively modified or modified as a group in order to simulate operation of the engine of the propulsion system.

2. The method of claim 1, further comprising:
   receiving output signals from the controller, the output signals representing operation of the controller; and
   analyzing the output signals to determine if the controller is operating properly.

3. The method of claim 2, further comprising:
   outputting the analyzed output signals to the controller.

4. The method of claim 2, further comprising:
   generating a configuration signal in response to analyzing the output signals, wherein the configuration signal instructs the controller to modify its configuration; and
   providing the configuration signal to the controller.

5. The method of claim 2, wherein the output signals are received in response to the plurality of signals.

6. The method of claim 1, further comprising:
   receiving output signals from the controller, the output signals representing a control signal to the engine of the propulsion system; and
   modifying the plurality of signals in response to the output signals, wherein the plurality of signals are selectively modified or modified as a group in order to simulate operation of the engine of the propulsion system.

7. A system for simulation of an engine of a propulsion system, comprising:
   an interface to a controller of the engine of the propulsion system;
   a simulation module embodied in a computer readable storage medium, the simulation module being configured to:
      generate a plurality of signals, the signals representing operating parameters of the engine of the propulsion system, wherein the signals are selected from the group consisting of: propulsion system operating state, propulsion system generator speed, propulsion system turbine speed, propulsion system oil level, propulsion system oil pressure, propulsion system fuel level, propulsion system fuel pressure, propulsion system temperature, and combinations thereof;
      provide the plurality of signals to the controller of the engine of the propulsion system via the interface; and
      modify the plurality of signals wherein the plurality of signals are selectively modified or modified as a group in order to simulate operation of the engine of the propulsion system; and
   a processor configured to execute the simulation module and to communicate with the interface.

8. The system of claim 7, the simulation module being further configured to:
   receive output signals from the controller via the interface, the output signals representing operation of the controller; and
   analyze the output signals to determine if the controller is operating properly.

9. The system of claim 8, further comprising:
   a user interface, wherein the simulation module is further configured to output the analyzed output signals from the controller via the user interface.

10. The system of claim 8, the simulation module being further configured to:
   generate a configuration signal in response to analyzing the output signals, wherein the configuration signal instructs the controller to modify its configuration; and
   providing the configuration signal to the controller via the interface.

11. The system of claim 8, wherein the output signals are received in response to the plurality of signals.

12. The system of claim 7, the simulation module being further configured to:
   receive output signals from the controller, the output signals representing a control signal to the engine of the propulsion system; and
   modify the plurality of signals in response to the output signals, wherein the plurality of signals are selectively modified or modified as a group in order to simulate operation of the engine of the propulsion system.

13. A non-transitory computer readable storage medium comprising instructions for causing a processor to perform a method of simulation of an engine of a propulsion system, the method comprising:
   generating a plurality of signals, the signals representing operating parameters of the engine of the propulsion system, wherein the signals are selected from the group consisting of: propulsion system operating state, propulsion system generator speed, propulsion system turbine speed, propulsion system oil level, propulsion system oil pressure, propulsion system fuel level, propulsion system fuel pressure, propulsion system temperature, and combinations thereof;
   providing the plurality of signals to a controller of the engine of the propulsion system; and
   modifying the plurality of signals, wherein the plurality of signals are selectively modified or modified as a group in order to simulate operation of the engine of the propulsion system.

14. The computer readable storage medium of claim 13, the method further comprising:
   receiving output signals from the controller, the output signals representing operation of the controller; and
   analyzing the output signals to determine if the controller is operating properly.

15. The computer readable storage medium of claim 14, the method further comprising:
   outputting the analyzed output signals to the controller.

16. The computer readable storage medium of claim 14, the method further comprising:

generating a configuration signal in response to analyzing the output signals, wherein the configuration signal instructs the controller to modify its configuration; and providing the configuration signal to the controller.

17. The computer readable storage medium of claim 14, wherein the output signals are received in response to the plurality of signals.

18. The computer readable storage medium of claim 13, the method further comprising:

receiving output signals from the controller, the output signals representing a control signal to the engine of the propulsion system; and modifying the plurality of signals in response to the output signals, wherein the plurality of signals are selectively modified or modified as a group in order to simulate operation of the engine of the propulsion system.

* * * * *